(12) United States Patent  (10) Patent No.: US 8,130,399 B2
Nishimi et al.  (45) Date of Patent: Mar. 6, 2012

(54) PRINT MANAGEMENT APPARATUS AND PRINT MANAGEMENT SYSTEM WITH PLURAL IMAGE FORMING APPARATUSES AND A DESIGNATING SECTION THAT DESIGNATES ONE OF THE IMAGE FORMING APPARATUSES FOR PRINTING

(75) Inventors: Toshitsugu Nishimi, Osaka (JP); Yasushi Tsukamoto, Osaka (JP); Akira Fujikura, Osaka (JP)

(73) Assignee: Kyocera Mita Corporation (JP)

( * ) Notice: Subject to any disclaimer, the term of this patent is extended or adjusted under 35 U.S.C. 154(b) by 1021 days.

(21) Appl. No.: 12/051,891

(22) Filed: Mar. 20, 2008

(65) Prior Publication Data

US 2008/0239376 A1 Oct. 2, 2008

(30) Foreign Application Priority Data

Mar. 27, 2007 (JP) ................................ 2007-080722
Mar. 27, 2007 (JP) ................................ 2007-080724

(51) Int. Cl.
*G06F 15/00* (2006.01)
*G06F 3/12* (2006.01)
*G06K 1/00* (2006.01)

(52) U.S. Cl. ..................................... 358/1.15; 358/1.13
(58) Field of Classification Search ........................ None
See application file for complete search history.

(56) References Cited

U.S. PATENT DOCUMENTS

| 2004/0036908 A1 | 2/2004 | Yagita et al. |
| 2004/0190042 A1* | 9/2004 | Ferlitsch et al. ............. 358/1.15 |
| 2007/0263246 A1* | 11/2007 | Bressan et al. ............... 358/1.15 |

FOREIGN PATENT DOCUMENTS

| JP | 2002-135508 | 5/2002 |
| JP | 2004-54909 | 2/2004 |

* cited by examiner

*Primary Examiner* — Douglas Tran
(74) *Attorney, Agent, or Firm* — Gerald E. Hespos; Michael J. Porco

(57) ABSTRACT

A print management apparatus includes: a communication section connected to image forming apparatuses via a network for transmitting a print job to one of the apparatuses, and receiving management information from each apparatus including information about a print function of the apparatus and alternate printing instructions to allow another image forming apparatus perform an alternate printing. A management section creates and stores management data indicating respective states of the apparatuses based on management information received by the communication section. A designating section designates a first of the apparatuses and allows the communication section to transmit a print job to the designated first apparatus, designates a second apparatus to perform an alternate printing with reference to the management data of the management section, and allows the communication section to transmit the print job to the designated second apparatus if an alternate printing instruction is received from the designated first apparatus.

20 Claims, 2 Drawing Sheets

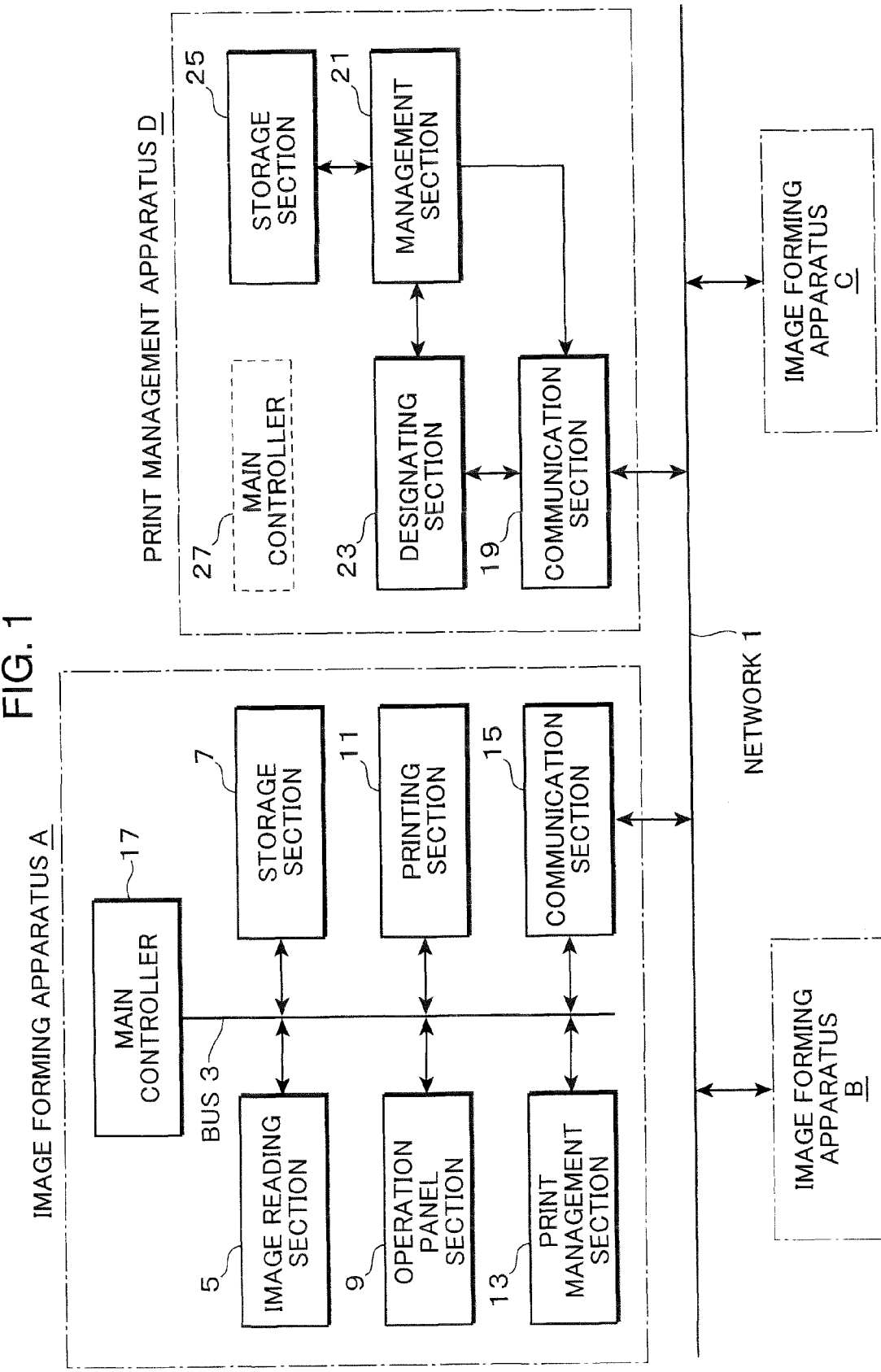

FIG. 2

| APPARATUS | FUNCTION (VERSION) | FUNCTION (PRINT SPEED) | FUNCTION (RESOLUTION) | POSITIONAL INFORMATION |
|---|---|---|---|---|
| A | XXXXX | SPEED 1 | 1200dpi | 1F ZONE 3 |
| B | XXXXX | SPEED 1 | 1200dpi | 1F ZONE 9 |
| C | XXXXX | SPEED 2 | 2400dpi | 1F ZONE 13 |

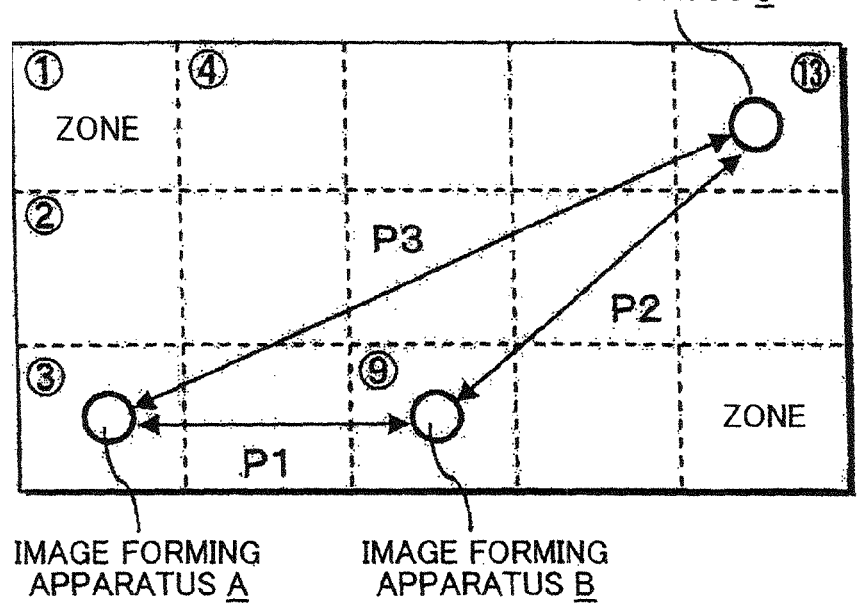

| APPARATUS | NUMBER OF WAITING UNPRINTED JOBS | ESTIMATED PRINT COMPLETION TIME | OPERATION TIME PERIOD | FUNCTION (PRINT SPEED) |
|---|---|---|---|---|
| A | XXXX | XXXXXX | XXXXXX | SPEED 1 |
| B | X | XXXXXX | XXXXXX | SPEED 1 |
| C | X | XXXXXX | XXXXXX | SPEED 2 |

PRINT MANAGEMENT APPARATUS AND PRINT MANAGEMENT SYSTEM WITH PLURAL IMAGE FORMING APPARATUSES AND A DESIGNATING SECTION THAT DESIGNATES ONE OF THE IMAGE FORMING APPARATUSES FOR PRINTING

BACKGROUND OF THE INVENTION

1. Field of the Invention

The present invention relates to a print management apparatus, a print management system, and a print management program. More particularly, it relates to a technology that when one of a plurality of image forming apparatuses is allowed, such as a copying machine, a complex machines (MFP: Multi Functional Peripheral), to perform printing, a print management apparatus allows an other image forming apparatus to perform an alternate printing.

2. Description of the Related Art

In recent years, a printing system including image forming apparatuses, such as copying machines and complex machines, is provided with a function of allowing an other image forming to perform an alternate printing in the case where a usually used image forming apparatus cannot perform printing due to errors caused by shortage in the supply of printing sheets or malfunction (e.g., jamming) during printing operation. For example, a printing system of this kind is disclosed in Japanese Patent Unexamined Publication No. 2004-54909. In the printing system disclosed in this publication, an information processing apparatus which generates a print job to be printed by a printing apparatus can set an alternate printing condition that inhibits a targeted printing apparatus from performing printing. In accordance with the set alternate printing condition and an operation state of the targeted printing apparatus, it is determined whether an other printing apparatus different from the targeted printing apparatus should perform the alternate printing. When it is determined that the other image forming apparatus should perform the alternate printing, the print job is transmitted to the other printing apparatus to perform the alternate printing.

In this printing system, when the alternate printing is performed by the other printing apparatus, it is necessary for the user him/herself to set conditions for the alternate printing so that the other printing apparatus outputs a print result having the same quality as the targeted printing apparatus. However, in this printing system, it is necessary for the user to manually set alternate printing conditions for each print job. Such setting operation is cumbersome and is likely to cause mistakes in operations. Since such operation which requires a user to set alternate printing conditions so as to attain a print result having the same quality as the targeted printing apparatus is burdensome for the user, improvement has been desired.

SUMMARY OF THE INVENTION

The present invention was made to solve the above-described problems, and its object is to provide a technology which enables simplification in user's setting of an alternate printing, and easily maintain the same print quality between use of an alternate printing and non-use of an alternate printing.

A print management apparatus according to an aspect of the present invention includes: a communication section which is connected to a plurality of image forming apparatuses via a network for transmitting a print job to certain one of the plurality of image forming apparatuses, and receiving from each of the plurality of image forming apparatuses management information of each image forming apparatus including information about a print function of the image forming apparatus and an alternate printing instruction of allowing an other image forming apparatus to perform an alternate printing; a management section for creating and storing management data indicating respective states of the plurality of image forming apparatuses based on the management information received by the communication section; and a designating section for designating a first one of the plurality of image forming apparatuses and allowing the communication section to transmit a print job to the designated first image forming apparatus, and designating a second image forming apparatus operable to perform an alternate printing with reference to the management data of the management section, and allowing the communication section to transmit the print job to the designated second image forming apparatus if an alternate printing instruction is received from the designated first image forming apparatus.

These and other objects, features and advantages of the present invention will become more apparent upon reading of the following detailed description along with the accompanied drawings.

BRIEF DESCRIPTION OF THE DRAWINGS

FIG. 1 is a block diagram schematically showing a print management system including a printing management apparatus in accordance with a first embodiment of the present invention.

FIG. 2 shows a management table in accordance with the first embodiment.

FIG. 3 shows a positional relationship between installed image forming apparatuses in accordance with the first embodiment.

FIG. 4 shows an other management table in accordance with a second embodiment of the invention.

DETAILED DESCRIPTION OF THE PREFERRED EMBODIMENTS

Hereinafter, a print management apparatus, a print management system, and a print management program in accordance with a first embodiment of the present invention will be described with reference to the drawings. FIG. 1 is a block diagram showing a print management system including a print management apparatus in accordance with the first embodiment. For convenience, the print management program in accordance with the first embodiment will be described in course of description of the print management system.

In FIG. 1, the print management system is connected to a plurality of image forming apparatuses A, B, and C, and a server D which serves as the print management apparatus in accordance with the first embodiment of the present invention via a network 1. The network 1 is a known network such as a company LAN, the Internet, or the like.

Since the image forming apparatuses A, B, and C have substantially the same configuration, only the image forming apparatus A will be described, and detailed description and depiction about the image forming apparatus B and C will be omitted.

For convenience, the image forming apparatus A will be described firstly.

The image forming apparatus A is, for example, a complex machine (MFP). The image forming apparatus A includes an image reading section 5, a storage section 7, an operation panel section 9, a printing section 11, a print management section 13, a communication section 15, and a main controller 17 for controlling those. They are connected via a bus 3.

The image reading section 5 is, for example, a known scanner which is adapted to read an image from a plurality of pages of printed documents optically, and execute filtering processing and the like to generate electronic image data as a print job. The image data generated by the image reading section 5 is stored in the storage section 7 for each page.

The storage section 7 includes a hard disk (HDD) or the like, and is adapted for storing image data generated by the image reading section 5, management information about the printing section 11 which will be described hereinafter, and a program for allowing the main controller 17 to perform a print management operation.

The operation panel section 9 is, for example, a known liquid crystal display panel on which a state of operation of the apparatus and a result of input through the operation panel section 9 are displayed under a control of the main controller 17. Further, the operation panel section 9 includes a touch-type keyboard for allowing a user to input instructions, selections, and settings related to various operations such as copying processing, printing processing, scanner processing, and facsimile transmission/reception processing. The operation panel section 9 is provided in an upper outer periphery of a main body (not illustrated) of the apparatus.

In accordance with a print job generated by the image reading section 5 or received from the server D by the communication section 15, the printing section 11 converts print object data included in the print job to print image data, and performs toner-developing processing, and transfers and fixes a toner image to a print sheet. The printing section 11 is provided with a known color or monochromatic printing mechanism.

The print management section 13 stores management information including information relating to the printing section 11 and information relating to the apparatus. In response to a request from the server D, further, the print management section 13 is operable to output to the communication section 15 the management information and an alternate printing instruction of allowing an other image forming apparatus to perform an alternate printing when the printing section 11 of the image forming apparatus A cannot execute the print job.

The management information includes, for example, as shown in a section for the apparatus A in FIG. 2, print function information such as a serial number and a version of a printing mechanism, print speed, and print resolution, and positional information indicating a position where the image forming apparatus A is installed, for example, 1st floor (F) zone 3, 1st floor (F) zone 9, or 1st floor (F) zone 13. Further, the management information may include information relating to the kind of print sheets which are set, information relating to a state of operation of the printing section 11, print waiting information, and the like. The print management section 13 allows the communication section 15 to output the management information to the server D in response to a request from the server D. The group of management information including the management information of the image forming apparatuses A, B, and C is management data in the server D which will be described hereinafter.

The print management section 13 determines whether a print job can be executed by the printing section 11 immediately with reference to the management information, for example, when the communication section 15 receives the print job from the server D. When the print management section 13 determines that the print job cannot be printed immediately, it outputs an instruction indicating that the determination result as an alternate printing instruction (in other words, an instruction of asking an other image forming apparatus to perform alternate printing) to the communication section 15.

The communication section 15 is an interface section adapted to receive a print job from the server D via the network 1 and send the management information and the alternate printing instruction to the server D in accordance with a predetermined protocol. The communication section 15 also performs the facsimile transmission/reception.

The main controller 17 includes a CPU and a ROM which store an operating system as a basic operation program of the CPU, and is adapted to control the image reading section 5, the storage section 7, the operation panel section 9, the printing section 11, the print management section 13, the communication section 15, and the like. In the above, the print management section 13 is described as being separate from the main controller 17. However, the main controller 17 may perform whole or a part of functions of the print management section 13.

The image forming apparatuses B and C also have a configuration which is substantially the same as that of the image forming apparatus A. However, description of that will be omitted, as described above.

Next, the server D as the print management apparatus in accordance with the embodiment of the present invention will be described.

As shown in FIG. 1, the server D includes a communication section 19, a management section 21, a designating section 23, a storage section 25, and a main controller 27 for controlling those, and has a conventionally known configuration as a server.

The communication section 19, which is under a control of the main controller 27, serves as an interface section adapted to receive management information from the image forming apparatuses A, B, and C, and outputs the management information to the management section 21 via the network 1. Further, the communication section 19 outputs a request of acquiring management information from the designating section 23 and outputs a print job to the image forming apparatuses A, B, and C via the network 1.

The management section 21, which is under the control of the main controller 27, is adapted to perform data management by forming a management table indicating respective states of the image forming apparatuses A, B, and C connected to the network 1 based on the management information transmitted from the image forming apparatuses A, B, and C and received by the communication section 19, and controls the storage section 25 to store the management table as the management data. The management section 21 and the storage section 25 constitute the management section.

As shown in FIG. 2, the management table arranges print function information including a serial number and a version, a print speed and a print resolution of a print engine, and positional information including installed positions of the image forming apparatuses A, B, and C, e.g., 1st floor (F) zone 3, 1st floor (F) zone 9, and 1st floor (F) zone 13 in relation with the image forming apparatuses A, B, and C, and is renewed and changed at a predetermined time.

The designating section 23, which is under the control of the main controller 27, is adapted to control the communication section 19 to output a request of acquiring management information to the image forming apparatuses A, B, and C which are connected to the network 1, and designate certain one of the image forming apparatuses A, B, and C, and allow the communication section 19 to output a print job to the designated one of the image forming apparatuses A, B, and C.

The print job to be outputted to the designated one of the image forming apparatuses A, B, and C is received by the communication section 19 of the server D from, for example, an unillustrated computer or the other image forming apparatuses in such a state where the certain one of the image forming apparatuses A, B, and C which performs printing is designated.

When the communication section 19 receives the alternate printing instruction and the print job from certain one of the image forming apparatuses A, B, C, further, the designating section 23 designates with reference to the management data stored in the management section 21 the certain one of the image forming apparatuses A, B, and C that is different from the image forming apparatus which has transmitted the alternate printing instruction and the print job as an optimal apparatus for execution of printing of the print job, and allows the communication section 19 to output the print job to the designated image forming apparatus.

An image forming apparatus (designation condition) which designating section 23 designates as an optimal apparatus to perform the alternate printing of the print job is: (1) One of the image forming apparatuses A, B, and C which has the same basic printing performance, e.g., provided with a printing mechanism having the same as or similar to that of a previously designated image forming apparatus; (2) One of the image forming apparatuses that is located at a position or place close to (more preferably, closest to) a previously designated image forming apparatus; and (3) One of the image forming apparatuses which satisfies both (1) and (2). Each of the alternate printing designation conditions is set in advance in the designating section 23, or attached to the print job and received by the communication section 19 so that the designating section 23 uses the same as the alternate printing designation condition. The image forming apparatuses A, B, and C which have the same basic printing performance are named as brother machines or series machines.

The remoteness determination which is performed by the designating section 23 to determine distances between the image forming apparatus A, B, and C is accomplished, for example, by plotting positions of the installed image forming apparatuses A, B, C in a floor map as shown in FIG. 3, and calculating distances P1, P2, P3 to compare them to one another. Further, the identicalness or similarity of the image forming apparatuses A, B, and C in the aspect of print speed, print resolution, or the like is determined based on mere comparison of numerical data.

The main controller 27 includes a CPU and a ROM storing an operating system as a basic operation program of the CPU, and is operable to control the communication section 19, the designating section 23, the management section 21, and the storage section 25.

The storage section 25 includes, for example, a hard disk and the like, and stores a print management program in accordance with the first embodiment of the present invention. The main controller 27 performs operations related to print management, which will be described hereinafter, in accordance with the print management program. When the print management program is recorded in a recording medium such as a CD-ROM, a flexible disk, or the like, it is stored in the storage section 25 by a way of mounting a recording medium to an unillustrated recording medium reading device and installing the same. Further, when the print management program is stored in a web server on the Internet, it is stored in the storage section 25 by a way of downloading the print management program from the web server.

Next, operations of the print management system will be described. The operations will be described based on a premise that the management section 21 of the server D creates the management data in advance, and the management data is already stored in the storage section 25.

In the server D, when the designating section 23 designates, for example, the image forming apparatus A and allows the communication section 19 to transmit a print job to the image forming apparatus A via the network 1, the communication section 15 of the image forming apparatus A receives the print job and outputs the received print job to the printing section 11 and the print management section 13.

The print management section 13 of the image forming apparatus A refers to the already stored management information to thereby determine from a state of printing of the printing section 11 whether printing of the print job can be performed immediately, or whether the printing section 11 has adequate printing performance for executing the print job. If the print job cannot be performed immediately, or if the printing section 11 does not have adequate printing performance for executing the print job, the print management section 13 allows the communication section 15 to send the alternate printing instruction and the print job to the server D via the network 1.

In the server D, when the communication section 19 receives the alternate printing instruction, it outputs the alternate printing instruction to the designating section 23. When the designating section 23 receives the alternate printing instruction, it refers to the management data managed by the management section 21 to thereby determine an image forming apparatus which has the same basic printing performance (e.g., a serial number or a version) as that of the image forming apparatus A as an optimal image forming apparatus to execute the print job, for example, the image forming apparatus B. Then, the designating section 21 designates the image forming apparatus B as an alternate image forming apparatus which performs the alternate printing, and allows the communication section 19 to output the print job received from the image forming apparatus A to the image forming apparatus B through the network 1.

The designating section 23 may designate an image forming apparatus which is optimal to perform the alternate printing based on similarity in functions such as speed or resolution in place of the identicalness in the basic printing performance or with respect to the identicalness in the basic printing performance.

Further, in the image forming apparatus which is designated by the designating section 23 as an alternate image forming apparatus (the image forming apparatus B in the embodiment), the print management section 13 performs determination on whether the printing section 11 can perform the printing. When printing of the print job cannot be performed, the print management section 13 allows the communication section 15 to send the alternate printing instruction and the print job to the server D via the network 1.

When the designating section 23 of the server D receives the alternate printing instruction from the image forming apparatus (the image forming apparatus B in the embodiment) which is newly designated as an alternate image forming apparatus, the designating section 23 further designates a next image forming apparatus which is optimal, and causes the communication section 19 to output the print job.

In the above, the image forming apparatus which originally received the print job from the server D as an image forming apparatus which executes the print job transmits the print job when it transmits the alternate printing instruction to the server D. Alternatively, the server D may store the print job, for example, in a memory of the main controller 27 or the storage section 15 even after it transmits the print job to the image forming apparatus which is originally designated as an image forming apparatus which executes the print job. The image forming apparatus which is originally designated as an image forming apparatus which executes the print job may transmit only the alternate printing instruction without transmitting the print job when it transmits the alternate printing instruction to the server D. The server D which receives the alternate printing instruction may allow the communication section 19 to transmit the print job to an other image forming apparatus designated as an alternate image forming apparatus.

As described above, in the print management system in accordance with the embodiment of the present invention, the image forming apparatuses A, B, and C and the server D for managing those are connected via the network 1. Each of the image forming apparatuses A, B, and C includes the printing section 11 for printing a print job, the print management section 13 for outputting management information of the printing section 11 and an alternate printing instruction in the case where the print job cannot be executed by the printing section 11 to the communication section 15, and the communication section 15 for receiving the print job and outputting the print job to the printing section 11 and transmitting the management information and the alternate printing instruction to the server D via the network 1. The server D includes the communication section 19 for transmitting a print job to the image forming apparatuses A, B, and C, and receiving the management information and the alternate printing instruction via the network 1, the management section 21 and the storage section 25 for managing the management information of the image forming apparatuses A, B, and C connected to the network 1 based on the received management information, and the designating section 23 for designating an other image forming apparatus which is optimal to perform the alternate printing with reference to the management data of the management section 21 when the alternate printing instruction is received from the designated one of the image forming apparatuses A, B, and C, and allowing the communication section 19 to output the print job to the designated image forming apparatus.

Therefore, a user can allow an other image forming apparatus to perform the alternating printing as an alternate image forming apparatus without setting each print job or individually setting an alternate image forming apparatus among the image forming apparatuses A, B, and C in the case where an image forming apparatus which is originally targeted to perform printing cannot perform printing, so that user's setting of alternate printing can be simplified considerably. Further, the alternate image forming apparatus can attain a print result having the same quality as the originally targeted printing apparatus without user's manual setting of alternate printing conditions of alternate printing for each job. Accordingly, the uniform print result and print quality of printed matter can be easily achieved in both the non-alternate printing and the alternate printing.

In other words, an image forming apparatus having a print function, for example, an image resolution similar to that of the originally targeted image forming apparatus is set to be designated as an alternate image forming apparatus, thereby assuring printed matter to have an originally aimed print result and print quality.

Further, since an other image forming apparatus located close to the previously designated image forming apparatus can be designated as an alternate image forming apparatus, a user can obtain the printed matter at a position close to that of the previously designated image forming apparatus, and can easily collect the printed matter.

In the print management system, an image forming apparatus optimal to perform an alternate printing of a print job may be determined based on other conditions, such as the same product series, the same using department or group, other than a serial number and a version of a print engine, print functions such as print speed and resolution, and a closeness in the distance therebetween.

The above-described server D may not be required to be a single server which is exclusively used on the network 1. For example, the server D may be configured by the part of a complex machine, a printer, or the like that is connected to the network 1 and can perform the same function. In other words, in the print management system, a computer which is provided in any one of the image forming apparatuses connected to the network 1 may serve as the server D.

The above-described server D has the communication section 19, the management section 21, the designating section 23, the storage section 25, and the main controller 27 for controlling those, and executes processing necessary for execution of the above-described alternate printing, thereby simplifying user's setting of an alternate printing, and making it easier to achieve the uniformity in print quality at the time of alternate printing.

Next, a print management apparatus, a print management system, and a print management program in accordance with a second embodiment of the present invention will be described with reference to FIG. 1 and FIG. 4. Further, the same configuration as that of the first embodiment will be omitted from description, and main different portions will be described herebelow. For convenience, a print management program in accordance with the second embodiment will be described in course of description of the print management system.

A print management section 13 of the second embodiment stores management information, but the management information is print function information, such as the number of waiting unprinted jobs (print jobs which are not executed yet) in the printing section 11, estimated completion time of printing the last print job among printing jobs which are waiting to be executed (estimated end time of execution of print jobs which are waiting to be executed), an operation time period, such as AM (for example, on or after 6:00 AM and before 12:00 PM), PM (for example, on or after 12:00 PM and before 10:00 PM), and midnight (for example, on or after 10:00 PM and before 6:00 AM) which are set for each image forming apparatus (alternatively, the time period may include a time period during which operating rate of each image forming apparatus is equal to or greater than a predetermined value), and print speed, as shown in FIG. 4. Further, as information included in the management information, information related to the kind of print sheets and the like may be included. In accordance with a request from the server D, respective communication sections 15 of the image forming apparatuses A, B, and C output management information to the server D. The group of management information including management information of the image forming apparatuses A, B, and C are management data for the server D.

As shown in FIG. 4, a management table in accordance with the second embodiment arranges the number of waiting unprinted jobs in the printing section 11, estimated print completion time of printing the last unprinted job, operation time periods such as AM, PM, and midnight, print function information such as print speed, in relation with the image forming apparatuses A, B, and C, and is renewed and changed at a predetermined time.

In the second embodiment, a print job may include print completion designation information indicating by what time printing should be completed.

When the communication section 19 of the server D receives an alternate printing instruction from an image forming apparatus which is originally targeted as an image forming apparatus which performs the printing, the designating section 23 of the server D refers to the management data of the management section 21 to thereby designate an image forming apparatus capable of performing the printing based on the print job earlier as an alternate image forming apparatus, and allows the communication section 19 to output the print job to the designated image forming apparatus.

An alternate image forming apparatus which is optimal to perform the alternate printing is determined in accordance with predetermined designation conditions: for example, (a) an image forming apparatus which can complete printing at the earliest time; (b) an image forming apparatus which can complete printing at a time closest to designated print completion time indicated by print completion designation information included in the print job; (c) an image forming apparatus which can complete printing at the earliest time in the time period in which the designation print completion time falls; and (d) an image forming apparatus satisfying those conditions (a), (b), and (c). Each of the designation conditions for the alternate printing is set in advance in the designating section 23 or attached to the print job so that the communication section 19 receives the designation conditions, and the designating section 23 uses the same as designation conditions for the alternate printing.

Next, operations of the print management system in accordance with the second embodiment will be described. Also in description of the operations of the print management system in accordance with the second embodiment, operations which are the same as those of the first embodiment described above will be omitted.

In the server D, when the communication section 19 receives the alternate printing instruction, it outputs the alternate printing instruction to the designating section 23. The designating section 23, when receiving the alternate printing instruction, refers to the management data shown in FIG. 4 and managed by the management section 21, and performs designation of an alternate image forming apparatus, for example, by determining an other image forming apparatus which can complete printing processing at earliest, in accordance with certain one of the designation conditions (a) through (d), and allows the communication section 19 to output the print job to the image forming apparatus which is designated as an alternate image forming apparatus via the network 1.

As described above, in the print management system in accordance with the second embodiment, the plurality of image forming apparatuses A, B, and C, and the server D for managing those are connected via the network 1, and each of the image forming apparatuses A, B, and C includes the printing section 11 for printing a print job, the print management section 13 for outputting management information of the printing section 11 and alternate printing instruction in the case where the print job cannot be executed in the printing section 11 to the communication section 15, and the communication section 15 for outputting the received print job to the printing section 11 and transmitting the management information and the alternate printing instruction to the server D via the network 1. The server D includes the communication section 19 for transmitting the print job to the image forming apparatuses A, B, and C and receiving management information and alternate printing instruction via the network 1, the management section 21 and the storage section 25 for managing management information of the image forming apparatuses A, B, and C connected to the network 1 based on the received management information, and the designating section 23 designating, for example, the image forming apparatuses B or C which can complete a printing processing at earliest as an image forming apparatus which performs the alternate printing with reference to the management data in the management section 21 when the alternate printing instruction is received from the designated one of the image forming apparatuses A, B, and C, and allowing the communication section 19 to output the print job.

Therefore, the uniform print result and print quality of the printed matter can be easily achieved in both the non-alternate printing and the alternate printing in the print management system in accordance with the second embodiment. Further, the user can early obtain a printed matter which is printed by the alternate printing.

Further, in the print management system in accordance with the second embodiment, an other image forming apparatus which can complete a printing processing early is designated as an alternate image forming apparatus. Accordingly, it becomes likely that the printing processing is executed more assuredly by the alternate image forming apparatus. This reduces a network traffic and thereby makes it unlikely to cause a transfer loss of the print job, and reduces the load on the network. Making the transfer loss of the print job be unlikely to occur suppresses increase in the amount of transferred data between the server D and the image forming apparatuses B, C.

Further, in the print management system in accordance with the second embodiment, if a print completion time of a print job is designated, an image forming apparatus which can complete printing at a time most close to the designated print completion time designated to perform alternate printing, so that a print result can be obtained early at the designated print completion time.

Further, in the print management system in accordance with the second embodiment, a print result can be obtained at the earliest time within a user's desirable completion time period for printing.

In the print management system in accordance with the second embodiment, the determination conditions for designating an alternate image forming apparatus may include various operation rate information, which are other than the above-described number of waiting unprinted jobs, estimated end time of a print job which is the last one among print jobs which are waiting for execution, apparatus operation time period, print speed, and the like.

As described above, an inventive print management apparatus includes: a communication section which is connected to a plurality of image forming apparatuses via a network for transmitting a print job to certain one of the plurality of image forming apparatuses, and receiving from each of the plurality of image forming apparatuses management information of each image forming apparatus including information about a print function of the image forming apparatus and an alternate printing instruction of allowing an other image forming apparatus to perform an alternate printing; a management section for creating and storing management data indicating respective states of the plurality of image forming apparatuses based on the management information received by the communication section; and a designating section for designating a first one of the plurality of image forming apparatuses and allowing the communication section to transmit a print job to the designated first image forming apparatus, and designating a second image forming apparatus operable to perform an alternate printing with reference to the management data of the management section, and allowing the communication section to transmit the print job to the designated second image forming apparatus if an alternate printing instruction is received from the designated first image forming apparatus.

The designating section may preferably designate the second image forming apparatus having a print function similar to that of the first image forming apparatuses an alternate image forming apparatus which perform the alternate printing.

According to these construction, when the alternate printing instruction is received from the image forming apparatus which is originally designated as an image forming apparatus which executes a print job via a network, the designating section designates an image forming apparatus which has a print function similar to that of the image forming apparatus which is originally designated as an alternate image forming apparatus which performs printing with reference to the management data of the management section, and the print job is outputted to the designated image forming apparatus. Accordingly, user's setting of alternate printing can be simplified, and uniform print results and print quality of a printed matter can be achieved in both the non-alternate printing and the alternate printing.

Further, an inventive a print management system includes a plurality of image forming apparatuses and a print management apparatus for managing each of the image forming apparatuses are connected via a network. Each of the plurality of image forming apparatuses includes: a printing section for executing a print job to perform printing; a print management section for outputting management information including a print function of the image forming apparatus, and outputting an alternate printing instruction for allowing an other image forming apparatus to perform an alternate printing if the printing section cannot execute the print job; and a communication section for receiving the print job via the network and outputting the print job to the printing section, and transmitting the management information and the alternate printing instruction to the print management apparatus. The print management apparatus includes: a communication section for transmitting a print job to certain one of the plurality of image forming apparatuses, and receiving from each of the plurality of image forming apparatuses management information of each image forming apparatus including information about a print function of the image forming apparatus and an alternate printing instruction of allowing an other image forming apparatus to perform the alternate printing via the network; a management section for creating and storing management data indicating respective states of the plurality of image forming apparatuses based on the management information received by the communication section; and a designating section for designating a first one of the plurality of image forming apparatuses and allowing the communication section to transmit a print job to the designated first image forming apparatus, and designating a second image forming apparatus operable to perform an alternate printing with reference to the management data of the management section, and allowing the communication section to transmit the print job to the designated second image forming apparatus if an alternate printing instruction is received from the designated first image forming apparatus.

According to this construction, when the printing section of the image forming apparatus cannot execute a print job, the print management section allows the communication section to output an alternate printing instruction to the print management apparatus. Then, in the print management apparatus, when the alternate printing instruction is received from the image forming apparatus, the designating section refers to management data of the management section to designate an image forming apparatus having a print function similar to that of the image forming apparatus designated as an alternate image forming apparatus, and allow the communication section to transmit the print job to the image forming apparatus which is designated as an alternate image forming apparatus. Accordingly, the uniform print result and print quality of a printed matter can be achieved in both the non-alternate printing and the alternate printing.

The designating section may preferably designate the second image forming apparatus having a basic print performance which is the same as that of the first image forming apparatus as an alternate image forming apparatus which performs the alternate printing.

Accordingly, a print result which is close to a printing quality of the image forming apparatus originally designated to execute the print job can be acquired by the alternate image forming apparatus.

It may be preferable that the management data of the management section includes resolution information of the image forming apparatuses, and the designating section designates the second image forming apparatus having a print function capable of achieving a resolution close to that of the first image forming apparatus as an alternate image forming apparatus which performs the alternate printing.

According to this construction, a print result which is close to a print quality at a resolution of the image forming apparatus which is originally designated to execute the print job can be obtained by the alternate image forming apparatus.

Also, it may be preferable that the management data of the management section includes positional information of the image forming apparatuses, and the designating section performs determination based on the positional information to designate the second image forming apparatus which is located at a position close to the first image forming apparatus as an alternate image forming apparatus.

According to this construction, a user can obtain a print result at a position close to the image forming apparatus which is originally designated to execute the print job.

Further, it may be preferable that the management data of the management section includes print speed information of the image forming apparatuses, and the designating section designates the second image forming apparatus which completes a print processing early as an alternate image forming apparatus which performs the alternate printing with reference to the management data of the management section if an alternate printing instruction is received from the first image forming apparatus.

According to this construction, when the image forming apparatus which is originally designated to execute the print job receives an alternate printing instruction via the network, the designating section designates the image forming apparatus which completes a print processing early as an alternate image forming apparatus with reference to the management data of the management section, and allows the communication section to transmit the print job to the designated image forming apparatus. Accordingly, a print result of the alternate printing can be obtained early from the image forming apparatus designated as an alternate image forming apparatus, so that user's setting of alternate printing can be simplified.

Moreover, it may be preferable that the print job includes print completion time designating information which designates a print completion time, and the designating section designates the second image forming apparatus which completes printing at a time closest to a print completion time indicated by the print completion time designating information as an alternate image forming apparatus with reference to the print job and the management data of the management section if an alternate printing instruction is received from the first image forming apparatus.

According to this construction, a user can obtain a print result from the image forming apparatus designated as an alternate image forming apparatus at a time close to the designated print completion time.

Further, it may be preferable that the print job includes print completion time designating information which designates a print completion time, and the designating section has a plurality of predetermined time period information, and the designating section determines a time period in which the print completion time indicated by the print completion time designating information falls among the plurality of time periods, and designates the second image forming apparatus which completes printing at earliest in the determined time period as an alternate image forming apparatus which performs the alternate printing with reference to the print job and the management data of the management section if an alternate printing instruction is received from the first image forming apparatus.

According to this construction, a user can obtain a print result from the image forming apparatus designated as an alternate image forming apparatus at earliest time in the period in which the designated print completion time falls.

This application is based on Japanese Patent application serial Nos. 2007-080722 and 2007-080724 both filed in Japan Patent Office on Mar. 27, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A print management apparatus comprising:
    a communication section which is connected to a plurality of image forming apparatuses via a network for transmitting a print job to certain one of the plurality of image forming apparatuses, and receiving from each of the plurality of image forming apparatuses management information of each image forming apparatus including information about a print function of the image forming apparatus and an alternate printing instruction of allowing an other image forming apparatus to perform an alternate printing;
    a management section for creating and storing management data indicating respective states of the plurality of image forming apparatuses based on the management information received by the communication section; and
    a designating section for designating a first one of the plurality of image forming apparatuses and allowing the communication section to transmit a print job to the designated first image forming apparatus, and designating a second image forming apparatus operable to perform an alternate printing with reference to the management data of the management section, and allowing the communication section to transmit the print job to the designated second image forming apparatus if an alternate printing instruction is received from the designated first image forming apparatus.

2. The print management apparatus according to claim 1, wherein the designating section designates the second image forming apparatus having a print function similar to that of the first image forming apparatuses as an alternate image forming apparatus which performs the alternate printing.

3. The print management apparatus according to claim 1, wherein the designating section designates the second image forming apparatus having a basic print performance which is the same as that of the first image forming apparatus as an alternate image forming apparatus which performs the alternate printing.

4. The print management apparatus according to claim 1, wherein the management data of the management section includes resolution information of the image forming apparatuses, and the designating section designates the second image forming apparatus having a print function capable of achieving a resolution close to that of the first image forming apparatus as an alternate image forming apparatus which performs the alternate printing.

5. The print management apparatus according to claim 1, wherein the management data of the management section includes positional information of the image forming apparatuses, and the designating section performs determination based on the positional information to designate the second image forming apparatus which is located at a position close to the first image forming apparatus as an alternate image forming apparatus which performs the alternate printing.

6. The print management apparatus according to claim 2, wherein the management data of the management section includes positional information of the image forming apparatuses, and the designating section performs determination based on the positional information to designate the second image forming apparatus which is located at a position close to the first image forming apparatus and has a print function similar to that of the first image forming apparatus as an alternate image forming apparatus which performs the alternate printing.

7. The print management apparatus according to claim 1, wherein the management data of the management section includes print speed information of the image forming apparatuses, and the designating section designates the second image forming apparatus which completes a print processing early as an alternate image forming apparatus which performs the alternate printing with reference to the management data of the management section if an alternate printing instruction is received from the first image forming apparatus.

8. The print management apparatus according to claim 2, wherein the management data of the management section includes print speed information of the image forming apparatuses, and the designating section designates the second image forming apparatus which completes a print processing early and has a print function similar to that of the first image forming apparatus as an alternate image forming apparatus which performs the alternate printing with reference to the management data of the management section if an alternate printing instruction is received from the first image forming apparatus.

9. The print management apparatus according to claim 1, wherein
    the print job includes print completion time designating information which designates a print completion time, and
    the designating section designates the second image forming apparatus which completes printing at a time closest to a print completion time indicated by the print completion time designating information as an alternate image forming apparatus which performs the alternate printing with reference to the print job and the management data of the management section if an alternate printing instruction is received from the first image forming apparatus.

10. The print management apparatus according to claim 2, wherein
the print job includes print completion time designating information which designates a print completion time, and
the designating section designates the second image forming apparatus which completes printing at a time closest to a print completion time indicated by the print completion time designating information and has a print function similar to that of the first image forming apparatus as an alternate image forming apparatus which performs the alternate printing with reference to the print job and the management data of the management section if an alternate printing instruction is received from the first image forming apparatus.

11. The print management apparatus according to claim 1, wherein
the print job includes print completion time designating information which designates a print completion time, and
the designating section has a plurality of predetermined time period information, and the designating section determines a time period in which the print completion time indicated by the print completion time designating information falls among the plurality of time periods, and designates the second image forming apparatus which completes printing earliest in the determined time period as an alternate image forming apparatus which performs the alternate printing with reference to the print job and the management data of the management section if an alternate printing instruction is received from the first image forming apparatus.

12. The print management apparatus according to claim 2, wherein
the print job includes print completion time designating information which designates a print completion time, and
the designating section has a plurality of predetermined time period information, and the designating section determines a time period in which the print completion time indicated by the print completion time designating information falls among the plurality of time periods, and designates the second image forming apparatus which completes printing earliest in the determined time period and has a print function similar to that of the first image forming apparatus as an alternate image forming apparatus which performs the alternate printing with reference to the print job and the management data of the management section if an alternate printing instruction is received from the first image forming apparatus.

13. A print management system in which a plurality of image forming apparatuses and a print management apparatus for managing each of the image forming apparatuses are connected via a network, wherein
each of the plurality of image forming apparatuses includes:
a printing section for executing a print job to perform printing;
a print management section for outputting management information including a print function of the image forming apparatus, and outputting an alternate printing instruction for allowing an other image forming apparatus to perform an alternate printing if the printing section cannot execute the print job; and
a communication section for receiving the print job via the network and outputting the print job to the printing section, and transmitting the management information and the alternate printing instruction to the print management apparatus, and
the print management apparatus includes:
a communication section for transmitting a print job to certain one of the plurality of image forming apparatuses, and receiving from each of the plurality of image forming apparatuses management information of each image forming apparatus including information about a print function of the image forming apparatus and an alternate printing instruction of allowing an other image forming apparatus to perform the alternate printing via the network;
an management section for creating and storing management data indicating respective states of the plurality of image forming apparatuses based on the management information received by the communication section; and
an designating section for designating a first one of the plurality of image forming apparatuses and allowing the communication section to transmit a print job to the designated first image forming apparatus, and designating a second image forming apparatus operable to perform an alternate printing with reference to the management data of the management section, and allowing the communication section to transmit the print job to the designated second image forming apparatus if an alternate printing instruction is received from the designated first image forming apparatus.

14. The print management system according to claim 13, wherein the designating section of the print management apparatus designates the second image forming apparatus having a print function similar to that of the first image forming apparatuses an alternate image forming apparatus which performs the alternate printing.

15. The print management system according to claim 13, wherein the designating section of the print management apparatus designates the second image forming apparatus having a basic print performance which is the same as that of the first image forming apparatus as an alternate image forming apparatus which performs the alternate printing.

16. The print management system according to claim 13, wherein the management data of the management section includes resolution information of the image forming apparatuses, and the designating section designates the second image forming apparatus having a print function capable of achieving a resolution close to that of the first image forming apparatus as an alternate image forming apparatus which performs the alternate printing.

17. The print management system according to claim 13, wherein the management data of the management section includes positional information of the image forming apparatuses, and the designating section of the print management apparatus performs determination based on the positional information to designate the second image forming apparatus which is located at a position close to the first image forming apparatus as an alternate image forming apparatus which performs the alternate printing.

18. The print management system according to claim 13, wherein the management data of the management section includes print speed information of the image forming apparatuses, and the designating section of the print management system designates the second image forming apparatus which completes a print processing early as an alternate image forming apparatus which performs the alternate printing with reference to the management data of the management section if an alternate printing instruction is received from the first image forming apparatus.

19. The print management system according to claim 13, wherein
the print job includes print completion time designating information which designates a print completion timing, and
the designating section of the print management apparatus designates the second image forming apparatus which completes printing at a time closest to a print completion time indicated by the print completion time designating information as an alternate image forming apparatus which performs the alternate printing with reference to the print job and the management data of the management section if an alternate printing instruction is received from the first image forming apparatus.

20. The print management system according to claim 13, wherein
the print job includes print completion time designating information which designates a print completion time, and
the designating section of the print management apparatus has a plurality of predetermined time period information, and the designating section determines a time period in which the print completion time indicated by the print completion time designating information falls among the plurality of time periods, and designates the second image forming apparatus which completes printing at earliest in the determined time period as an alternate image forming apparatus with reference to the print job and the management data of the management section if an alternate printing instruction is received from the first image forming apparatus.

* * * * *